(No Model.) 2 Sheets—Sheet 1.
H. J. VAN NOSTRAN.
HAY RAKE AND LOADER.
No. 569,688. Patented Oct. 20, 1896.
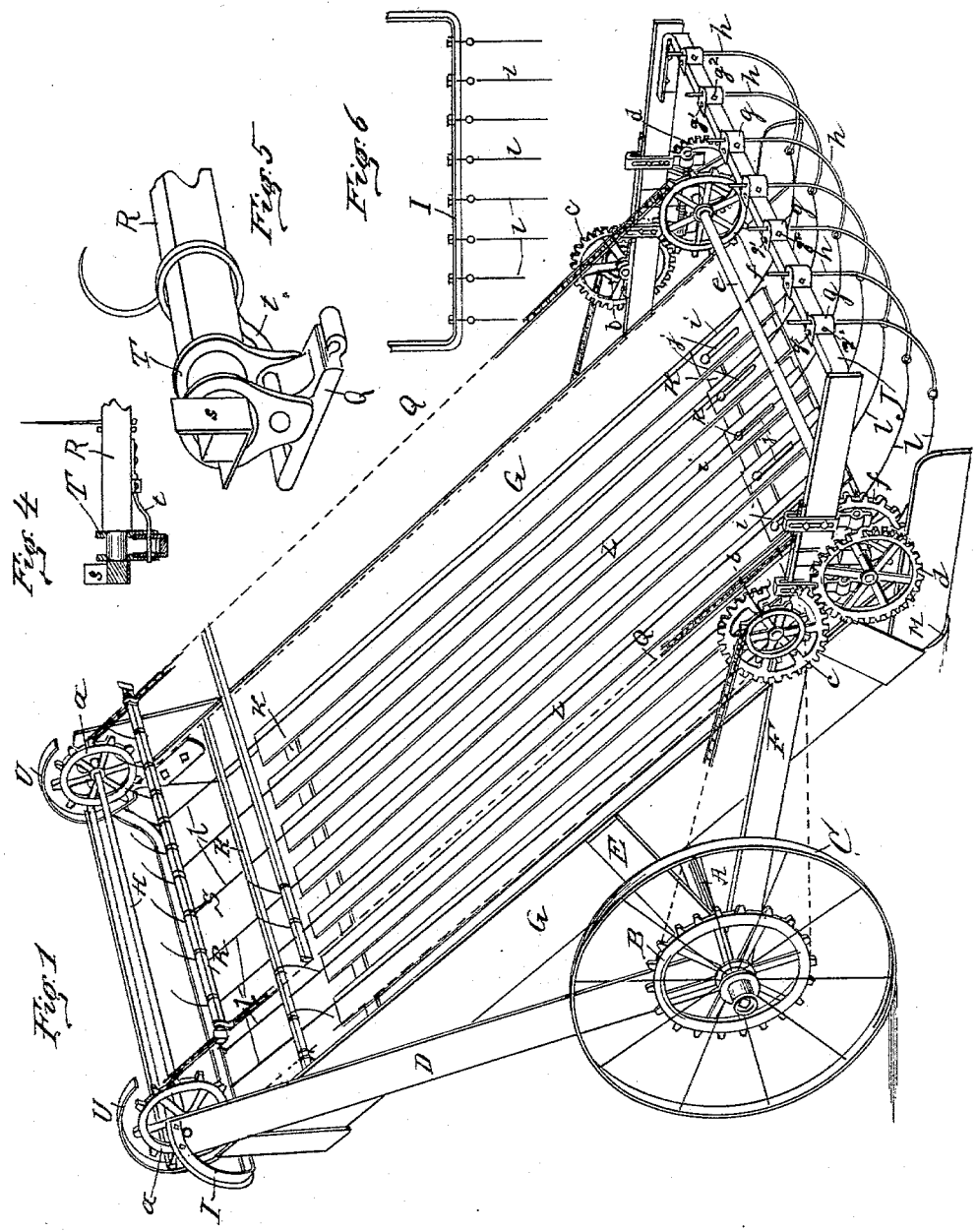
WITNESSES
INVENTOR
Homer J Van Nostran
By W K Miller
Attorney (No Model.) 2 Sheets—Sheet 2.
H. J. VAN NOSTRAN.
HAY RAKE AND LOADER.
No. 569,688. Patented Oct. 20, 1896.
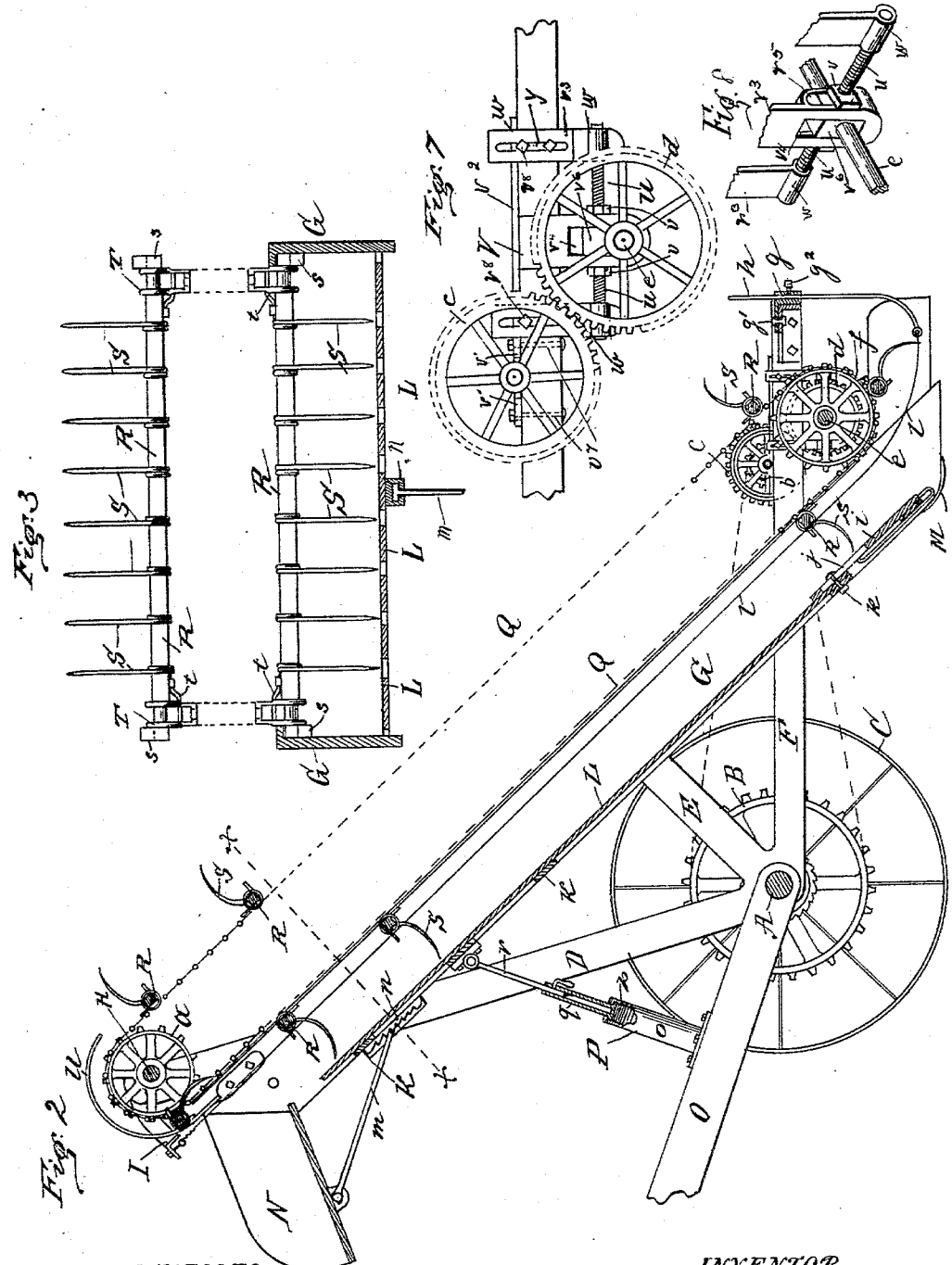
WITNESSES
INVENTOR
Homer J. Van Nostran
By W. E. Miller
Attorney

UNITED STATES PATENT OFFICE.

HOMER J. VAN NOSTRAN, OF CANTON, OHIO, ASSIGNOR OF TWO-THIRDS TO JOSEPH E. VAN NOSTRAN, OF SAME PLACE.

HAY RAKE AND LOADER.

SPECIFICATION forming part of Letters Patent No. 569,688, dated October 20, 1896.

Application filed October 30, 1895. Serial No. 567,368. (No model.)

*To all whom it may concern:*

Be it known that I, HOMER J. VAN NOSTRAN, a citizen of the United States, and a resident of Canton, county of Stark, State of Ohio, have invented a new and useful Improvement in Hay Rakes and Loaders, of which the following is a full, clear, and exact description, reference being had to the accompanying drawings, making part of this specification.

My invention relates to improvements in hay rakes and loaders; and it consists of certain features of construction and combination of parts that will hereinafter be described, and pointed out in the specification and claims.

Figure 1 of the accompanying drawings is a perspective view illustrating the invention. Fig. 2 is a longitudinal sectional view. Fig. 3 is a detailed sectional view through the line X X of Fig. 2. Fig. 4 is a sectional view of the connection between the rake-head and carrier-chain. Fig. 5 is a perspective view of the same. Fig. 6 is a plan view of the upper wire-guard or stripper support. Fig. 7 is a detailed view of the adjustable boxes carrying the sprocket, gear, and chain wheels, by means of which the chain-carrier is operated. Fig. 8 is a detailed perspective of a fragment of the gear-supporting box.

A denotes the axle, on which there is located a sprocket-wheel B, having a pawl engagement with the inner side of the drive-wheel C, as shown in Fig. 2.

The frame is carried on the axle A, and consists of radial supports D, E, and F, attached to the side-boards G. The support D passes upwardly, slightly inclined to the front, and forms a support for the cross-shaft H, on which are mounted the chain-wheels $a\ a$. To this support there is also attached the guard or stripper support I.

The support E is secured to the middle portion of the side-board G, while support F passes rearward and forms a support for the adjustable boxes carrying the sprockets $b\ b$ and gear-wheels $c\ c$ and $d\ d$. The gear-wheels $d\ d$ are attached to a shaft $e$, extending across the machine, and upon which in the inner side of the frame and in line with the chain-wheels $a\ a$ are mounted chain-wheels $f\ f$.

To the ends of the supports F F there is attached a coupling-bar J, extending across the machine, and on which there is mounted a number of boxes $g$, equal to the number of stripping-wires desired to be employed. These boxes are bolted to the coupling-bar at any desired point by means of a bolt $g'$. Through each of the boxes $g$ there is passed an adjustable support $h$, to which is attached the lower end of the stripping-wires. These supports $h$ are held in position by thumb-bolts $g^2$, passing through the sliding boxes. To the supports $h\ h$ are attached wires $l\ l$, of any number desired, which pass up over the trough of the machine and are attached to the support I at the top of the trough. These wires not only serve to hold the hay in the bottom of the trough and prevent its being blown away, but as the rake-teeth pass through or between them at the top of the machine strip the hay from the teeth.

To the bottom of the side-boards G G may be attached any number of cross-boards K K, which support the slats L L, extending from top to bottom of the machine and forming the bottom of the trough or conveyer. To the lower end of each of the slats L L are bolted short strips or slats $i\ i$, having cut therein slotted apertures $j\ j$, through which pass the adjusting-bolts $k\ k$, and by means of which the wear of the lower end of the slats may be taken up, and if the machine should in passing over an obstruction break any one of the lower ends of the slats a new one may be readily added thereto without removing the entire slat, as was necessary heretofore.

At each side of the machine and at the lower end of the sides G G there is attached a shoe M, which may be of any desired form, and which serves to keep the machine off of the ground.

The upper end of the trough is provided with a supplemental trough N, which may be adjusted at any angle of delivery by means of a pivotally-connected pawl $m$, engaging a rack $n$, attached to the bottom of the trough.

Intermediate the forward part of the trough and the tongue O there is provided a telescoping spring-support P, by means of which not only the front end of the trough may be supported and the rear end enabled to follow the undulations in the ground, but the machine may be also tilted or folded down toward the tongue for transportation, and when so folded down may be held in position by any well-known means. The barrel or shell $o$, housing the coiled spring $p$, is bolted to the upper face of the tongue. Through the barrel $o$ there extends a hollow compression-rod $q$, carrying the extension-rod $r$, which is pivotally connected to the bottom of the trough and adjusted to the compression-rod $q$ by means of a handle-bolt.

The power is transmitted from the sprocket-wheels B B to the sprocket-wheels $b\ b$ on the rear end of the machine by means of any of the well-known forms of driving-chains and is in turn communicated to the gear-wheels $c\ c$, which mesh into and drive the wheels $d\ d$. Upon the same shaft but inside the frame there are located the chain-wheels $f\ f$, on which, together with the chain-wheels $a\ a$ at the top of the trough, there are carried the chains Q Q, to which the rake-heads R, which carry the spring-teeth S, are attached at desired intervals by means of carrier-links T, pivoted to the chain-links and through which the end of the rake-heads rotatably pass, as is shown in Fig. 5.

To the end of the rake-head which passes through the carrier-link T there is attached an L-shaped plate $s$, which, as the chain Q Q moves along the trough and approaches the top thereof, engages with semicircular guides or ways U U, bolted to the ends of the sides G G and extending out around and over the chain-wheels $a\ a$, turning the rake-head in the carrier-link T and causing the spring-teeth to pass up between the stripping-wires $l$ and out of the hay. When the rake-heads have passed through the guides U U, the rake-head again assumes its normal position by means of the springs $t\ t$, which have one end attached to the rake-head and the other end to the carrier-link T and chain-link and are carried on down the trough to again engage the hay and carry it to the top of the trough, where it is in turn dumped.

For the purpose of tightening the chains the boxings of the wheels $b$, $c$, $d$, and $f$ on each side of the frame are so coupled together, as is shown in Fig. 7, that they can be moved forward or backward at one time and the gear-wheels $d\ d$ may be vertically adjusted to take up the wear in the cogs. The L-shaped box V is held in position upon the support F by bolts $v^7$ passing through slotted apertures $v'$ in the box-supporting plate.

The lower end of the box is extended below the supporting-plate $v^2$ and is provided with a vertical slot $v^4$, intersected by a slot $v^5$. A block $v^6$ has a vertical movement in the slot $v^4$ and carries the shaft $e$. Extending through this block above and at right angles to the shaft $e$ is a screw-threaded shaft $u$, provided with retaining-nuts $v\ v$ on either side of the box, the ends of the shaft being supported by vertically-adjusted boxes $w\ w$, bolted to the support F by means of bolts passing through the slotted aperture $y$ in the arms $v^3$ of said boxes.

When it is desired to tighten the drive-chains as well as the carrier-chains, the bolts $v^7$ are loosened and the gears $c\ d$ and sprocket-wheels $b\ f$ may be simultaneously moved without changing their relative positions. To tighten the carrier-chains, the nuts $v$ may be loosened and the shaft $e$ moved to the rear. To compensate for wear of the gear-wheels, the wheel $d$ may be moved toward the gear $c$ to effect the proper meshing by raising the arms $v^3$ and securing them in their adjusted position by the bolts $v^8$.

In operation the power is communicated from the driving-wheels to the chain-carrier wheels, causing the rake-heads to descend into the hay and the teeth thereof to carry it up through the trough where the rake-heads are turned by the guideway and the teeth are stripped of the hay, which passes from the spout to the wagon. When the rake-heads have passed through the guideway, they again assume their normal position and are carried on down the trough to again engage and carry the hay up through the trough.

Having thus fully described my invention, what I claim, and desire to secure by Letters Patent, is—

1. The combination with a hay-loader trough, of endless chains carrying rotatable rake-heads, and independently-adjustable stripping-wires arranged longitudinally of and above the bottom of the trough to strip the hay from the teeth of the rake, substantially as set forth.

2. The combination with a hay-loader trough, of stripping-wires, extending longitudinally thereover the full length of the trough, and independently adjustably secured at one of the ends thereof, substantially as described and for the purpose set forth.

3. In a hay-loader, the combination with the trough, of stripping-wires extending longitudinally above said trough, and a coupling-bar extending across the frame of the machine, boxes carried thereon, independently-adjustable supports engaging therewith for carrying one end of the stripping-wires, substantially as set forth.

4. The combination in a hay-loader, having gear and chain wheels, driven by a chain connection with the supporting and driving wheels, of sliding boxes supported on the rearwardly-projected frame thereof, having journaled therein, shafts carrying the gear and chain wheels, depending brackets, screw-threaded shaft supported therein, and the retaining-nuts, substantially as described and for the purpose set forth.

5. The combination in a hay-loading trough, of the slats extending longitudinally therethrough, and forming the bottom of the same, with extension-slats, having slotted apertures therein, and adapted to be adjustably attached to the lower ends of the bottom slats, substantially as described and for the purpose set forth.

6. The combination in a carrier-chain, for hay-loaders, of a carrier-link pivoted to said chain and provided with upwardly-projecting apertured lugs, with a rake-head journaled in the apertures of said lugs, the L-shaped trips s on the ends of said head adapted to engage with guides at the top of the trough of the loader whereby the teeth of the rake may be stripped from the hay, substantially as set forth.

In testimony whereof I have hereunto set my hand this 28th day of October, A. D. 1895.

HOMER J. VAN NOSTRAN.

Witnesses:
W. K. MILLER,
BURT A. MILLER.